United States Patent
Lachine et al.

(10) Patent No.: US 12,327,335 B2
(45) Date of Patent: Jun. 10, 2025

(54) GRADIENT ADAPTIVE RINGING CONTROL FOR IMAGE RESAMPLING

(71) Applicant: ATI Technologies ULC, Markham (CA)

(72) Inventors: Vladimir Lachine, Markham (CA); Jie Zhou, Markham (CA)

(73) Assignee: ATI Technologies ULC, Markham (CA)

( * ) Notice: Subject to any disclaimer, the term of this patent is extended or adjusted under 35 U.S.C. 154(b) by 437 days.

(21) Appl. No.: 17/563,843

(22) Filed: Dec. 28, 2021

(65) Prior Publication Data

US 2023/0206400 A1 Jun. 29, 2023

(51) Int. Cl.
| | | |
|---|---|---|
| G06T 5/00 | (2024.01) | |
| G06T 5/70 | (2024.01) | |
| G06T 15/50 | (2011.01) | |
| G06V 10/60 | (2022.01) | |

(52) U.S. Cl.
CPC .............. G06T 5/70 (2024.01); G06T 15/503 (2013.01); G06V 10/60 (2022.01); *G06T 2207/20024* (2013.01)

(58) Field of Classification Search
CPC .............. G06T 5/70; G06T 15/503; G06T 2207/20024; G06V 10/60
See application file for complete search history.

(56) References Cited

U.S. PATENT DOCUMENTS

| | | | |
|---|---|---|---|
| 5,819,035 A | 10/1998 | Devaney et al. | |
| 8,200,044 B2 | 6/2012 | Callway | |
| 2002/0118206 A1* | 8/2002 | Knittel | G06T 1/60 345/557 |
| 2002/0191701 A1 | 12/2002 | O'Brien, Jr. | |

(Continued)

FOREIGN PATENT DOCUMENTS

| | | | |
|---|---|---|---|
| CN | 101237523 | 8/2008 | |
| EP | 2052350 B1 * | 2/2013 | ............. G06T 5/002 |

OTHER PUBLICATIONS

Hou et al., "Reduction of image coding artifacts using spatial structure analysis," 2007 9th International Symposium on Signal Processing and Its Applications, Sharjah, 2007, pp. 1-4, doi: 10.1109/ISSPA.2007.4555349.

*Primary Examiner* — Xiao Liu
(74) *Attorney, Agent, or Firm* — Kowert, Hood, Munyon, Rankin & Goetzel, P.C.; Rory D. Rankin

(57) ABSTRACT

Systems, apparatuses, and methods for implementing gradient adaptive ringing control for image resampling are disclosed. A blending alpha calculation circuit generates a blending alpha value for a set of input pixels based on a normalized gradient calculated for the set of input pixels. The normalized gradient is a low-pass filtered gradient of the set of input pixels divided by a maximum gradient for the set of input pixels. The normalized gradient is passed through a mapping function so as to generate the blending alpha value. The mapping function is pre-tuned based on filter coefficients, video content type, pixel format, and so on. An (Continued)

interpolated pixel is generated for the set of input pixels by blending ringing free and ringing prone interpolation coefficients, or by blending results between ringing free and ringing prone interpolation filters, with the blending weight for each filter based on the blending alpha value.

20 Claims, 14 Drawing Sheets

(56) References Cited

U.S. PATENT DOCUMENTS

| | | | |
|---|---|---|---|
| 2005/0043619 A1* | 2/2005 | Sumanaweera | G06T 15/08 |
| | | | 600/437 |
| 2006/0110062 A1 | 5/2006 | Chiang et al. | |
| 2007/0152990 A1 | 7/2007 | Callway | |
| 2008/0137978 A1* | 6/2008 | Fu | H04N 23/6811 |
| | | | 382/255 |
| 2010/0002951 A1* | 1/2010 | Zhai | G06T 5/70 |
| | | | 375/E7.2 |
| 2010/0027905 A1 | 2/2010 | Zhang et al. | |
| 2014/0009469 A1 | 1/2014 | Shin et al. | |
| 2014/0056537 A1 | 2/2014 | Srivivasan et al. | |
| 2014/0211049 A1 | 7/2014 | Tsutsui et al. | |
| 2014/0369613 A1 | 12/2014 | Avadhanam et al. | |
| 2016/0117794 A1* | 4/2016 | Ivanovic | G06T 11/001 |
| | | | 345/596 |
| 2020/0027202 A1* | 1/2020 | Oh | G06T 5/70 |
| 2020/0077090 A1 | 3/2020 | Wennersten et al. | |
| 2022/0384544 A1 | 12/2022 | An et al. | |
| 2023/0144311 A1* | 5/2023 | Lee | G06T 5/20 |
| | | | 382/100 |

* cited by examiner $500 \longrightarrow \quad G'(i) = |Y'(i+1) - Y'(i)|, i = \overline{0,2}.$ $505 \longrightarrow \quad G'_{LPF} = \sum_{i=\overline{0,2}} w(i) \times G'(i), G'_{MAX} = \max_{i=\overline{0,2}}(G'(i))$ $510 \longrightarrow \quad G'_N = \begin{cases} \dfrac{G'_{LPF}}{G'_{MAX}}, & G'_{MAX} > 0 \\ 0, & otherwise \end{cases}$ $515 \longrightarrow G'_x(i,j) = Y'(i+1,j) - Y'(i,j) + Y'(i+1,j+1) - Y'(i,j+1)$ $520 \longrightarrow G'_y(i,j) = Y'(i,j+1) - Y'(i,j) + Y'(i+1,j+1) - Y'(i+1,j)$ $525 \longrightarrow G'_{LPF} = \sum_{i,j=\overline{0,2}} w(i,j) \times G'(i,j)$ $530 \longrightarrow G'_{MAX} = \max_{i,j=0,1,2}(G'(i,j)), G'(i,j) = .5 * (|G'_x(i,j)| + |G'_y(i,j)|), i = \overline{0,2}, j = \overline{0,2}$ $535 \longrightarrow w(i,j) = \dfrac{1}{16} \begin{bmatrix} 1 & 2 & 1 \\ 2 & 4 & 2 \\ 1 & 2 & 1 \end{bmatrix}.$

FIG. 5

GRADIENT ADAPTIVE RINGING CONTROL FOR IMAGE RESAMPLING

BACKGROUND

Description of the Related Art

Images and video frames undergo various stages of processing within an image, graphics, or video processing pipeline. When undergoing processing, the image and video frames can be encoded in different color spaces, with red, green, and blue (RGB) and luma-chroma (Y'C'bC'r) two of the more common color spaces. Also, the image/video frame can be encoded in linear or non-linear space, which can impact how the image/video frame is processed. In some cases, an image is referred to as being perceptual quantization (PQ) encoded, which means the image is in non-linear space. As used herein, the prime (') symbol indicates that the image/video frame is in non-linear space. For example, a Y'C'bC'r notation indicates that the image is in non-linear space. Similarly, a RGB notation means that the image is in linear space while a R'G'B' notation indicates that the image is in non-linear space. It is noted that when an image is described as being "gamma/PQ encoded" or having "gamma/PQ encoding", this implies that the image is in non-linear space.

Ringing is one of the visually annoying artifacts that can occur after performing image resampling (e.g., changing the spatial resolution). As used herein, the term "ringing" is defined as the generation of artifacts that appear as spurious pixel values near sharp edges or discontinuities in the input pixel data of an image or video frame. Ringing can be manifested as a halo in plain areas near edges. The stronger the edge, the more disruptive the ringing may be. Ringing is perceived by the human visual system (HVS) as annoying artifacts which depend on the surrounding spatial structures and amplitude of signal overshoot or undershoot.

BRIEF DESCRIPTION OF THE DRAWINGS

The advantages of the methods and mechanisms described herein may be better understood by referring to the following description in conjunction with the accompanying drawings, in which:

FIG. 5 includes equations for calculating normalized gradients in accordance with one implementation.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing gradient adaptive ringing control for image resampling are disclosed herein. In one implementation, a system includes a blending alpha calculation circuit and a blend circuit. In one implementation, the blending alpha calculation circuit generates a blending alpha value for a set of input pixels based on a normalized gradient calculated for the set of input pixels. In one implementation, the normalized gradient is a low-pass filtered gradient divided by a maximum gradient for the set of input pixels. In one implementation, the normalized gradient is passed through a mapping function so as to generate the blending alpha value. The mapping function is pre-tuned based on filter coefficients, video content type, pixel format, and so on. An interpolated pixel is generated for the set of input pixels by blending filtering between a ringing-free filter and a ringing-prone filter, with the blending weight for each filter being based on the blending alpha value.

Figure 1:
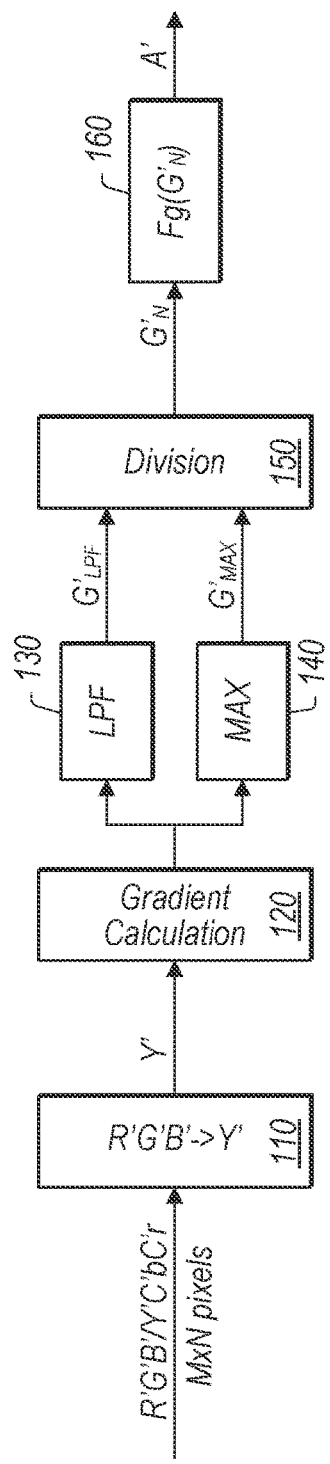
FIG. 1 is a block diagram of one implementation of a blending alpha calculation circuit for generating a blending alpha value.

Referring now to FIG. 1, a block diagram of one implementation of a blending alpha calculation circuit 100 for generating a blending alpha value is shown. In one implementation, luma generator 110 receives input pixels in a R'G'B' non-linear format. In other implementations, the input pixels can be encoded in any of various other formats. Luma generator 110 generates a luma component Y' for each input pixel. In one implementation, luma generator 110 receives an M×N block of pixels, with M and N positive integers, and with the values of M and N varying according to the design.

The luma component Y' is provided to gradient calculation engine 120. Gradient calculation engine 120 can be implemented using any suitable combination of circuitry and program instructions executable by processing elements (e.g., a central processing unit (CPU), a graphics processing unit (GPU)). In one implementation, a low-pass filtered gradient (or $G'_{LPF}$) and a maximum gradient (or $G'_{MAX}$) for the luma components of the input pixels are calculated. The calculation of the low-pass filtered gradient is represented by LPF block 130 and the calculation of the maximum gradient is represented by MAX block 140 in FIG. 1. In other implementations, other numbers of gradients based on the pixel component values of the input pixels may be calculated by blocks 120, 130 and 140.

As used herein, the term "gradient" is defined as the increase or decrease in a pixel component value between two adjacent pixels or adjacent sub-pixels. The pixel component value can be the value of a brightness component such as luma or luminance, the value of a color component such as red, green, blue, chroma blue, chroma red, the value of a transparency component such as alpha, or the value of some other component used in other color spaces or pixel formats.

In one implementation, gradient calculation engine 120 calculates gradients, LPF block 130 calculates a low-pass filtered gradient and MAX block 140 calculates a maximum gradient for the luma components of 3 adjacent pixels or a 3×3 block of pixels. In other implementations, gradient calculation engine 120 calculates gradients, LPF block 130 calculates a low-pass filtered gradient and MAX block 140 calculates a maximum gradient for the luma components of other numbers of pixels or of other sizes of pixel blocks.

The normalized gradient (or $G'_N$) is calculated by divider 150 by dividing the low-pass filtered gradient by the maximum gradient. The normalized gradient is provided to a function $F_g(G'_N)$ that can be approximated by a downloadable or programmable lookup table 160. The function $F_g(G'_N)$ can be pre-tuned for different sets of filter coefficients, for different types of video content (e.g., graphics, video, image), for different types of non-linear light space (e.g., gamma SDR, PQ HDR), and so on. In one implementation, alpha A' is generated according to the following formula: $A'=F_g(G'_N)=CLIP(0.0, O^A+G^A*(G'_N)^{E^A}, 1.0)$, where offset $O^A$, gain $G^A$, and exponent $E^A$ are tuning parameters. In one implementation, alpha A' is in a range of [0.0, 1.0]. In other implementations, alpha A' is encoded in other suitable ranges. The alpha A' value can then be used to blend filtering of the input pixels. More details on the blending based on the alpha A' value will be provided throughout this disclosure.

Figure 2:
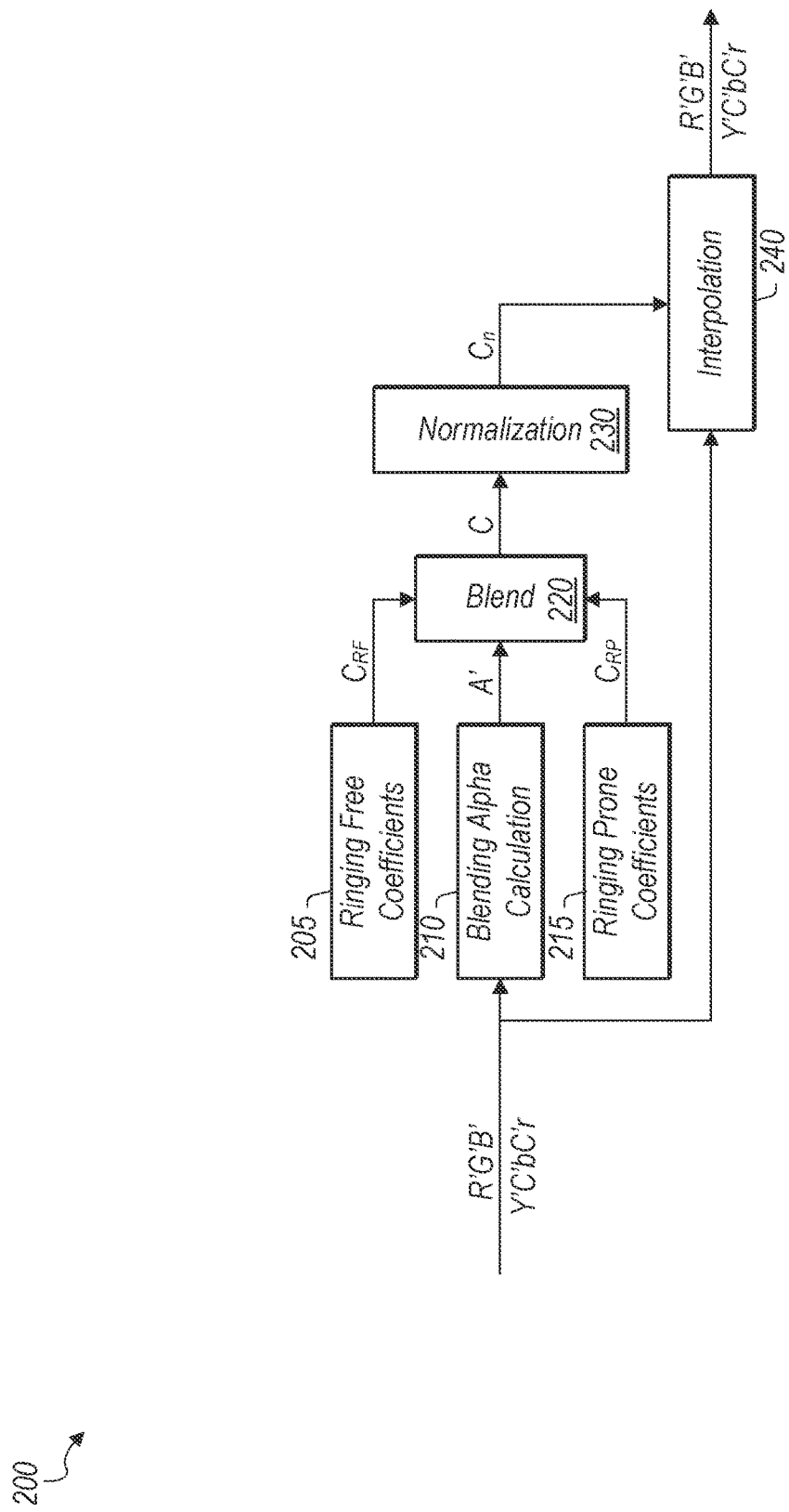
FIG. 2 is a block diagram of one implementation of a content adaptive image resampling circuit.

Turning now to FIG. 2, a block diagram of one implementation of a content adaptive image resampling circuit 200 is shown. Content adaptive image resampling circuit 200 blends coefficients of ringing free (RF) and ringing prone (RP) filters followed by normalization 230 of the blended coefficients and output pixel interpolation 240. For example, in one implementation, blending alpha calculation circuit 210 generates a blending alpha value A' which is coupled to blend unit 220 which blends the ringing free coefficients 205 and ringing prone coefficients 215 based on the blending alpha value A'. In one implementation, blending alpha calculation circuit 210 includes the components and structure of blending alpha calculation circuit 100 (of FIG. 1). Content adaptive image resampling circuit 200 can be used for separable two-dimensional image resampling (horizontal followed by vertical, or vice versa) and for non-separable two-dimensional image resampling.

Figure 3:
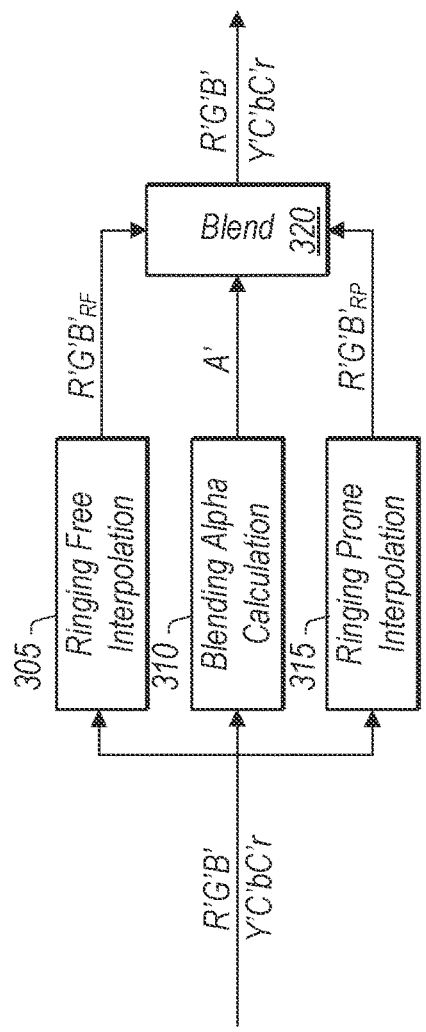
FIG. 3 is a block diagram of another implementation of a content adaptive image resampling circuit.

Referring now to FIG. 3, a block diagram of another implementation of a content adaptive image resampling circuit 300 is shown. Content adaptive image resampling circuit 300 blends interpolation results of ringing free (RF) interpolation filter 305 and ringing prone (RP) interpolation filter 315 for the same output pixel. In one implementation, blend circuit 320 blends the outputs of RF interpolation filter 305 and RP interpolation filter 315 based on the blending alpha value A' generated by blending alpha calculation circuit 310. For example, in one implementation, an A' value of 0 means that only RF interpolation filter 305 is applied while an A' value of 1 means that only RP interpolation filter 315 is applied. When A' is in between 0 and 1, the weighting is blended between RF interpolation filter 305 and RP interpolation filter 315, with values closer to 0 weighted toward RF interpolation filter 305 and values closer to 1 weighted toward RP interpolation filter 315. In one implementation, blending alpha calculation circuit 310 includes the components and structure of blending alpha calculation circuit 100 (of FIG. 1). Content adaptive image resampling circuit 300 can be used for separable two-dimensional image resampling and for non-separable two-dimensional image resampling.

Figure 4:
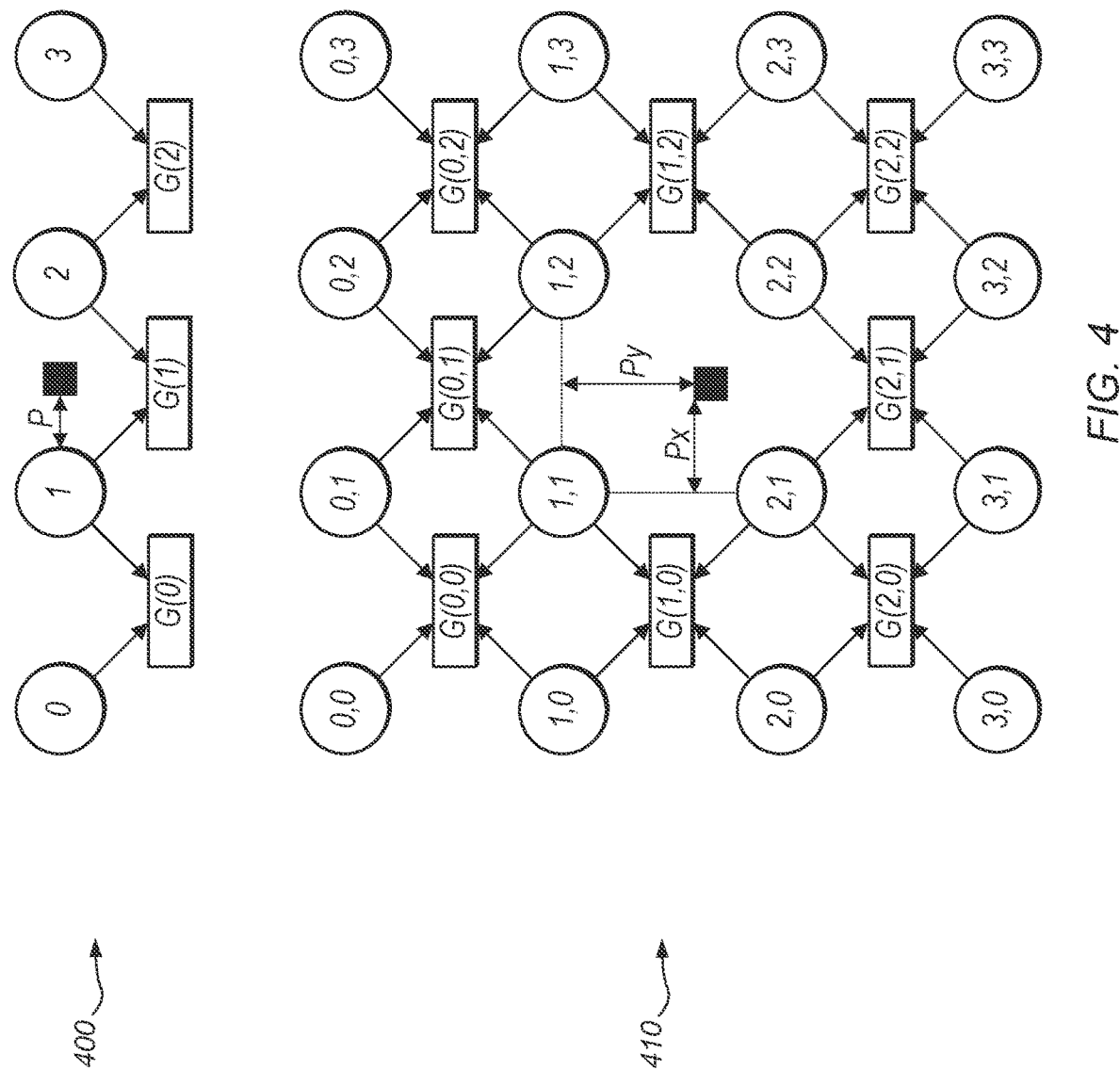
FIG. 4 illustrates diagrams of one-dimensional and two-dimensional pixel grids.

Turning now to FIG. 4, diagrams of one-dimensional and two-dimensional pixel grids are shown. Diagram 400 represents the input pixel neighborhood for performing a one-dimensional normalized gradient calculation. In one implementation, the luma gradients G'(0), G'(1), and G'(2) are calculated for each of three elementary two-pixel cells for pixels 0-3 in diagram 400. In one implementation, the luma gradients G'(0), G'(1), and G'(2) are calculated from the luma components (Y'(0), Y'(1), Y(2), and Y'(3)) of pixels 0-3 according to the formula 500 (of FIG. 5). The low pass filtered luma gradient $G'_{LPF}$ and the maximum luma gradient $G'_{MAX}$ are calculated according to formula 505. In one implementation, coefficients of a one-dimensional low pass filter have the following values: w(i)=0.25*[1 2 1]. In other implementations, coefficients of the one-dimensional low pass filter can have other values. The normalized luma gradient G'N is calculated from the low-pass filtered luma gradient and maximum luma gradient according to the formula 510.

Diagram 410 represents the input pixel neighborhood for performing a two-dimensional normalized gradient calculation. In one implementation, the luma gradients for non-separable two-dimensional interpolation are calculated according to the formulas 515 and 520. In one implementation, the low-pass filtered luma gradient and the maximum luma gradient are calculated according to the formulas 525 and 530, respectively, for non-separable two-dimensional interpolation. In one implementation, coefficients of the two-dimensional low pass filter have the values shown in equation 535. In one implementation, two-dimensional normalized luma gradient is calculated according to formula 510.

In one implementation, the blending alpha value A' is in a range of [0.0,1.0]. In one implementation, after the normalized luma gradient G'N is calculated according to formula 510, the blending alpha value A' is calculated from the normalized luma gradient $G'_N$ by the function $F_g(G'_N)$. In one implementation, the function $F_g(G'_N)$ is approximated by a downloadable lookup table. The function $F_g(G'_N)$ can be pre-tuned for different sets of filter coefficients, different types of video content, different pixel formats, and so on. In one implementation, the blending alpha value A' is calculated according to the following formula: $A'=F_g(G'_N)=CLIP(0.0, O^A+G^A*(G'N)^{E^A}, 1.0)$, where offset $O^A$, gain $G^A$, and exponent $E^A$ are tuning parameters.

In one implementation, the final red R', green G', and blue B' color components of an interpolated pixel are calculated according to the following equations:

$$R'=R'_{RF}+(R'_{RP}-R'_{RF})*A'$$

$$G'=G'_{RF}(G'_{RP}-G'_{RF})*A'$$

$$B'=B'_{RF}+(B'_{RP}-B'_{RF})*A'$$

In these equations, $R'_{RF}$, $G'_{RF}$, and $B'_{RF}$ are the red, green, and blue color components interpolated by the ringing free filter, and $R'_{RP}$, $G'_{RP}$, and $B'_{RP}$ are the red, green, and blue color components interpolated by the ringing prone filter.

Figure 6:
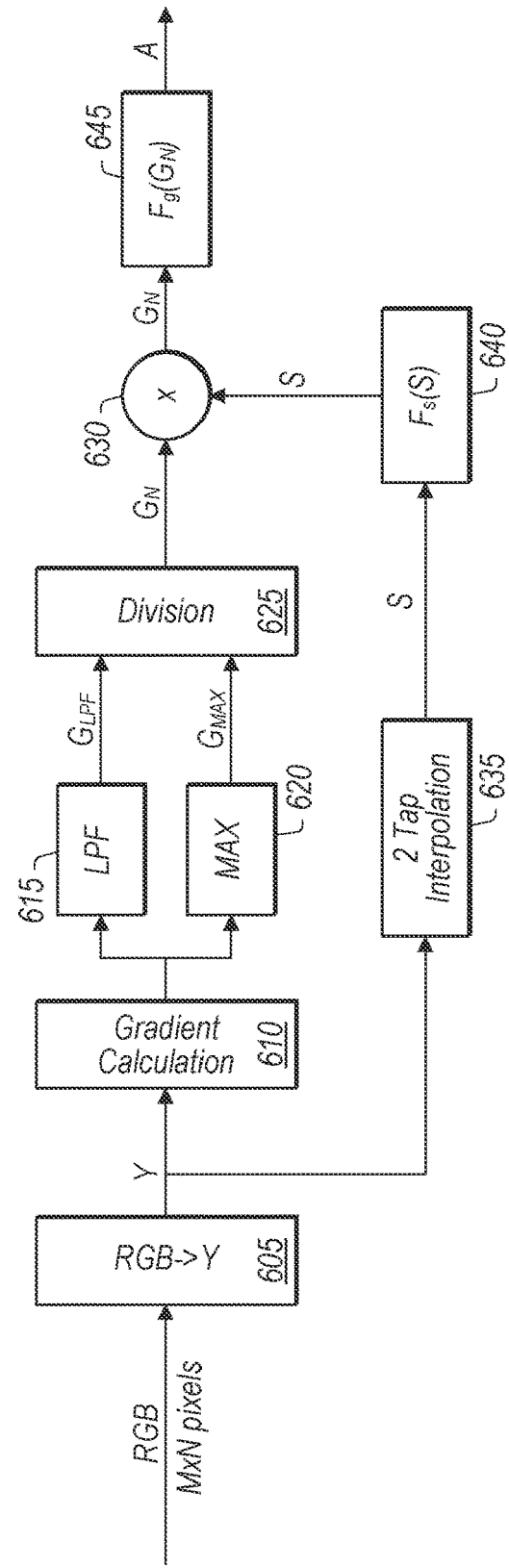
FIG. 6 is a block diagram of one implementation of a content adaptive image resampling mechanism.

Turning now to FIG. 6, a block diagram of one implementation of a content adaptive image resampling mechanism 600 is shown. In one implementation, content adaptive image resampling mechanism 600 receives input pixel data encoded in the RGB color space in linear light space. In this implementation, luminance converter 605 generates the luminance component for the input pixel data. Next, the luminance components are provided to gradient calculation circuit 610 which generates gradient values for the luminance components. In one implementation, each gradient value is the absolute value of the difference between the luminance components of two adjacent pixels. The luminance components are also provided to two-tap interpolation filter 635.

After the gradients are calculated for a set of input pixels, low-pass filter circuit 615 calculates a low-pass filter gradient value from the gradients. Also, maximum gradient selection circuit 620 selects the maximum gradient value from the gradient values generates by the gradient calculation circuit 610. The normalized gradient is calculated by divider 625 by dividing the low-pass filtered gradient by the maximum gradient. The output of two-tap interpolation filter 635 is coupled to function Fs(S) block 640. To avoid severe ringing artifacts like black dots for a video signal in linear light space, the function Fs(S) block 640 adjusts the normalized gradient by a factor that is a function of a local brightness estimate S=[0.0, 1.0] near the interpolated pixel. In one implementation, multiplier 630 multiplies the S output from Function Fs(S) block 640 by the normalized gradient, with the output of multiplier 630 coupled to function $F_g(G_N)$ block 645. In one implementation, the function $F_g(G_N)$ is approximated by a downloadable lookup table. The function $F_g(G_N)$ can be pre-tuned for different sets of filter coefficients, different types of video content, different pixel formats, and so on. The output of function $F_g(G_N)$ block 645 is the blending alpha value A.

Figure 7:
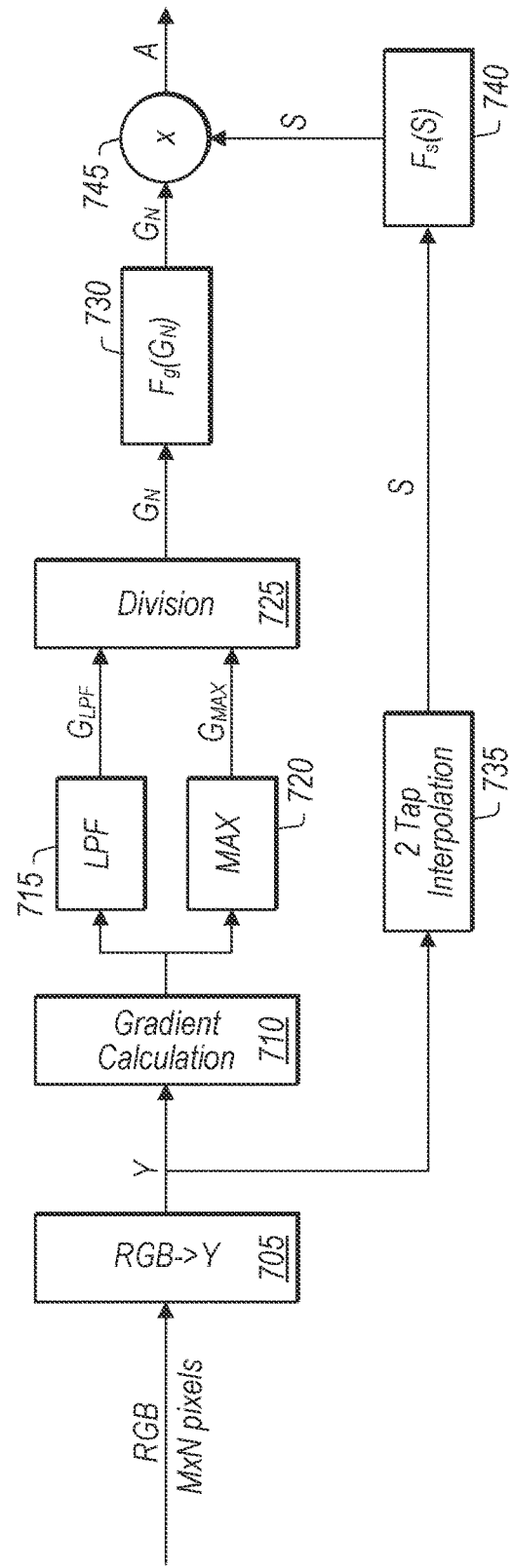
FIG. 7 is a block diagram of another implementation of a content adaptive image resampling mechanism.

Referring now to FIG. 7, a block diagram of another implementation of a content adaptive image resampling mechanism 700 is shown. Content adaptive image resampling mechanism 700 is similarly constructed to content adaptive image resampling mechanism 600 (of FIG. 6). However, a key difference between content adaptive image resampling mechanism 700 and content adaptive image resampling mechanism 600 is that multiplier 745 comes after $F_g(G_N)$ block 730 while multiplier 630 comes before $F_g(G_N)$ block 645. Accordingly, for content adaptive image resampling mechanism 700, multiplier 745 multiplies the normalized gradient output of $F_g(G_N)$ block 730 by the S output from Function Fs(S) block 740 to generate the blending alpha value A. Otherwise, the other components of luminance converter 705, gradient calculation circuit 710, low-pass filter circuit 715, maximum gradient selection circuit 720, divider 725, and two-tap interpolation filter 735 are arranged in a similar manner to the equivalent components of content adaptive image resampling mechanism 600.

Figure 8:
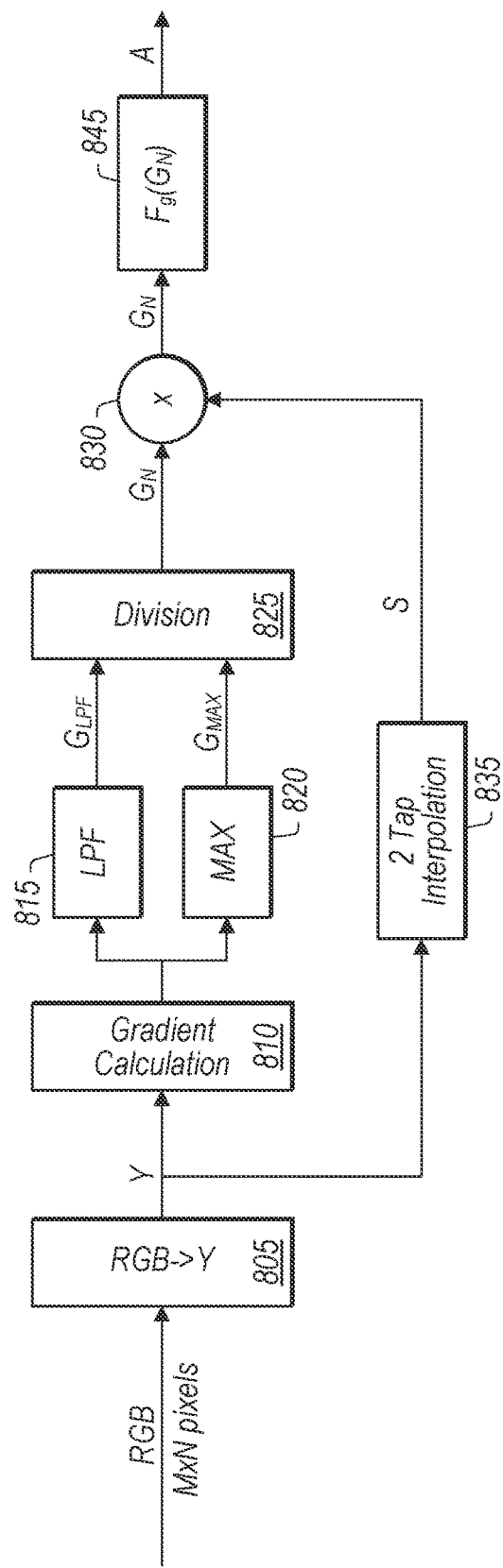
FIG. 8 is a block diagram of another implementation of a content adaptive image resampling mechanism.

Turning now to FIG. 8, a block diagram of another implementation of a content adaptive image resampling mechanism 800 is shown. Content adaptive image resampling mechanism 800 is similarly constructed to content adaptive image resampling mechanism 600 (of FIG. 6). A key difference between content adaptive image resampling mechanism 800 and content adaptive image resampling mechanism 600 is that the output of two-tap interpolation filter 835 feeds directly into multiplier 830 without passing through a Function Fs(S) block. Otherwise, the other components of content adaptive image resampling mechanism 800 such as luminance converter 805, gradient calculation circuit 810, low-pass filter circuit 815, maximum gradient selection circuit 820, divider 825, two-tap interpolation filter 835, and $F_g(G_N)$ block 845 are arranged in a similar manner to the equivalent components of content adaptive image resampling mechanism 600.

Figure 9:
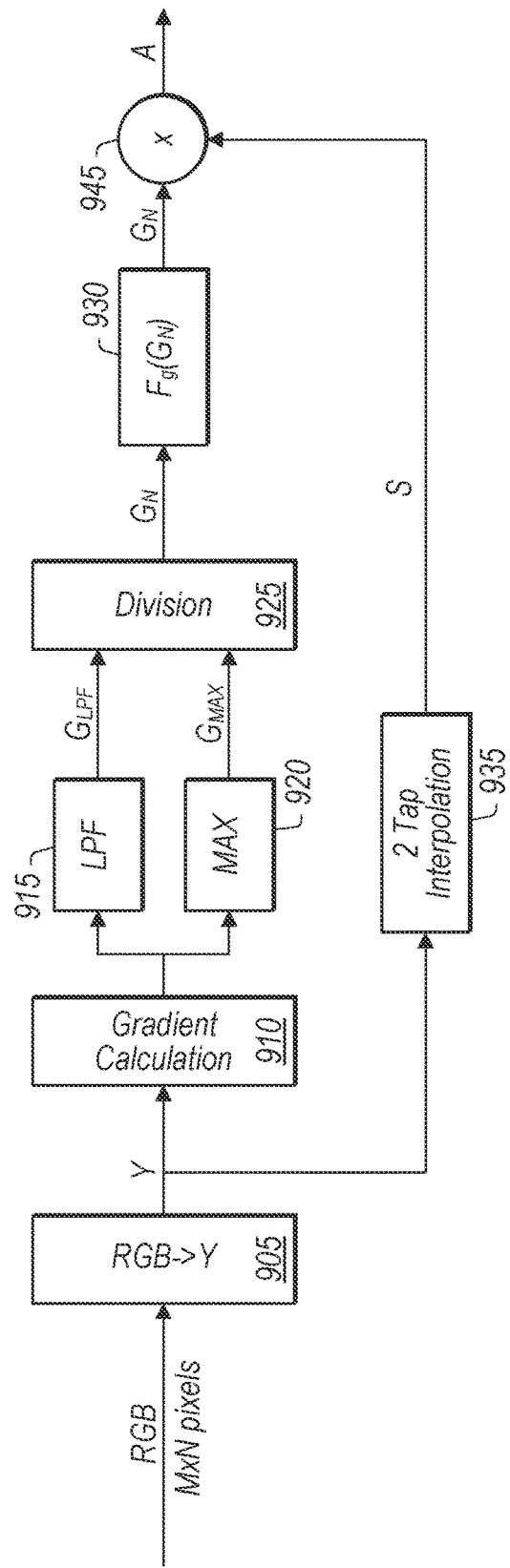
FIG. 9 is a block diagram of another implementation of a content adaptive image resampling mechanism.

Referring now to FIG. 9, a block diagram of another implementation of a content adaptive image resampling mechanism 900 is shown. Content adaptive image resampling mechanism 900 is similarly constructed to content adaptive image resampling mechanism 700 (of FIG. 7). However, content adaptive image resampling mechanism 900 differs from content adaptive image resampling mechanism 700 in that the output of two-tap interpolation filter 935 feeds directly into multiplier 945 without passing through a Function Fs(S) block. Otherwise, the other components of content adaptive image resampling mechanism 900 such as luminance converter 905, gradient calculation circuit 910, low-pass filter circuit 915, maximum gradient selection circuit 920, divider 925, $F_g(G_N)$ block 930, and two-tap interpolation filter 935 are arranged in a similar manner to the equivalent components of content adaptive image resampling mechanism 700.

Figure 10:
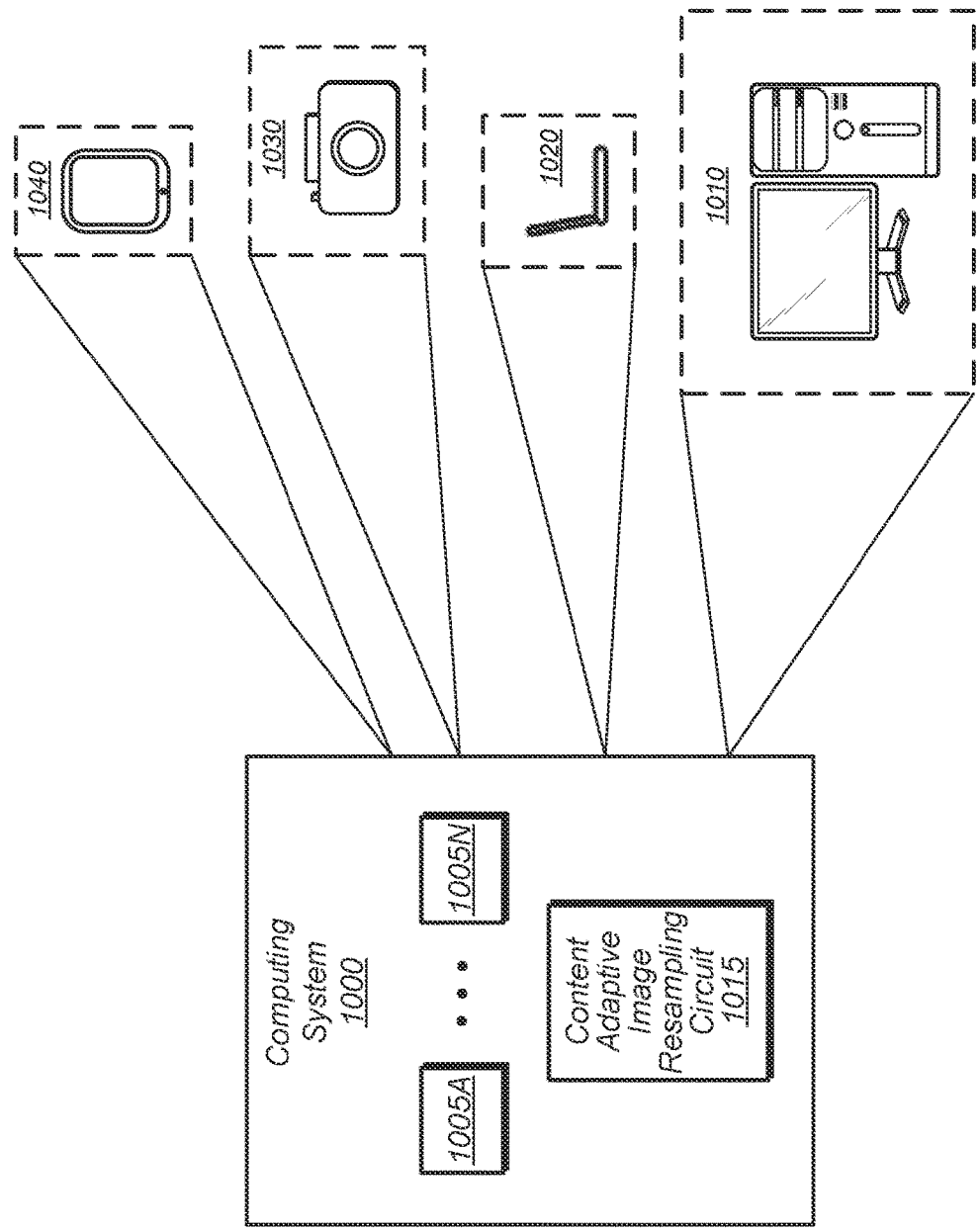
FIG. 10 is a block diagram of one implementation of a computing system.

Turning now to FIG. 10, a block diagram of one implementation of a computing system 1000 is shown. As shown, system 1000 represents chip, circuitry, components, etc., of a desktop computer 1010, laptop computer 1020, camera 1030, mobile device 1040, or otherwise. Other systems, devices, and apparatuses are possible and are contemplated. In the illustrated implementation, the system 1000 includes multiple components 1005A-N and at least one instance of content adaptive image resampling circuit 1015. Components 1005A-N are representative of any number and type of components, such as one or more processors, one or more memory devices, one or more peripheral devices, a display, and so on. Content adaptive image resampling circuit 1015 includes any of the circuit elements and components presented herein for implementing gradient adaptive blending of pixel data.

Figure 11:
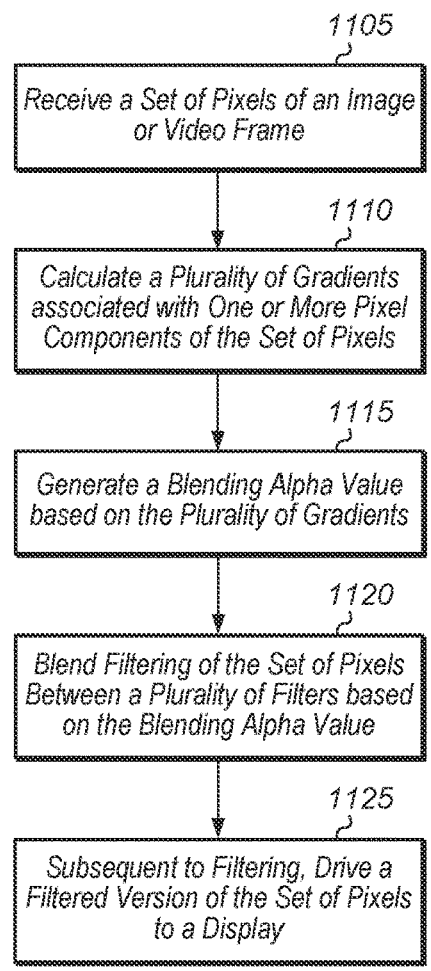
FIG. 11 is a generalized flow diagram illustrating one implementation of a method for employing gradient adaptive ringing control for image processing.
Figure 12:
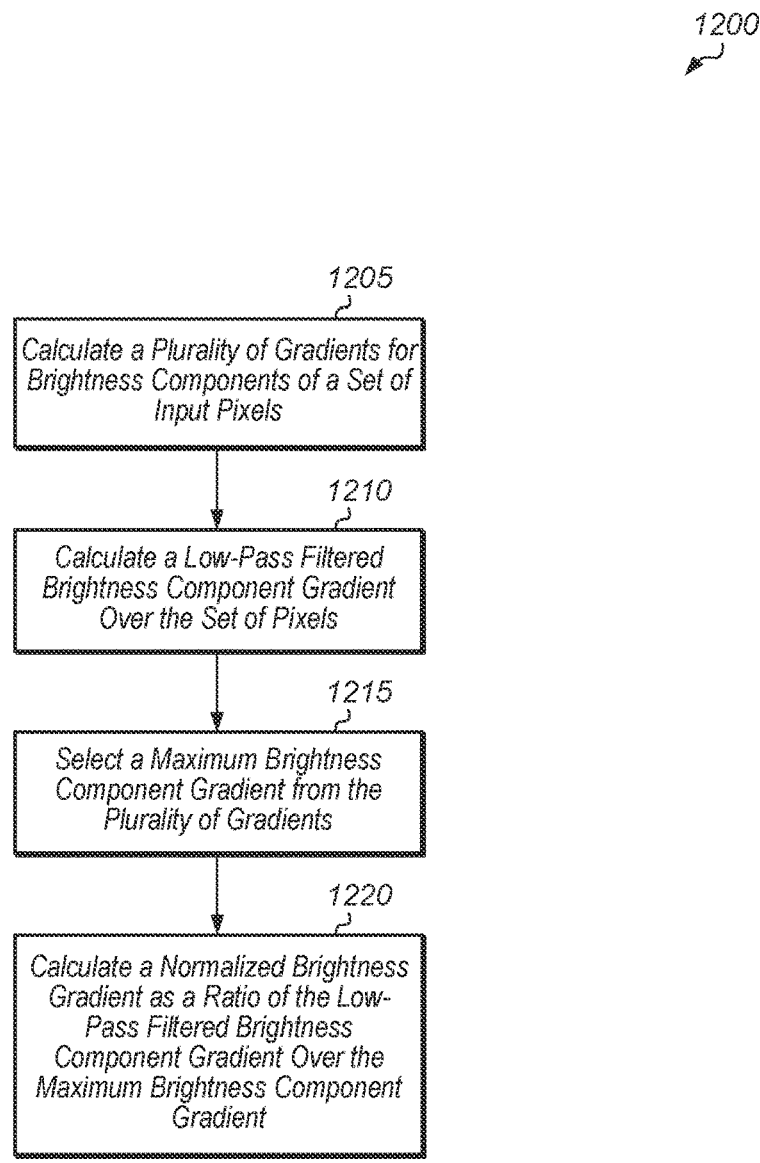
FIG. 12 is a generalized flow diagram illustrating one implementation of a method for generating a normalized brightness gradient for a set of input pixels.
Figure 13:
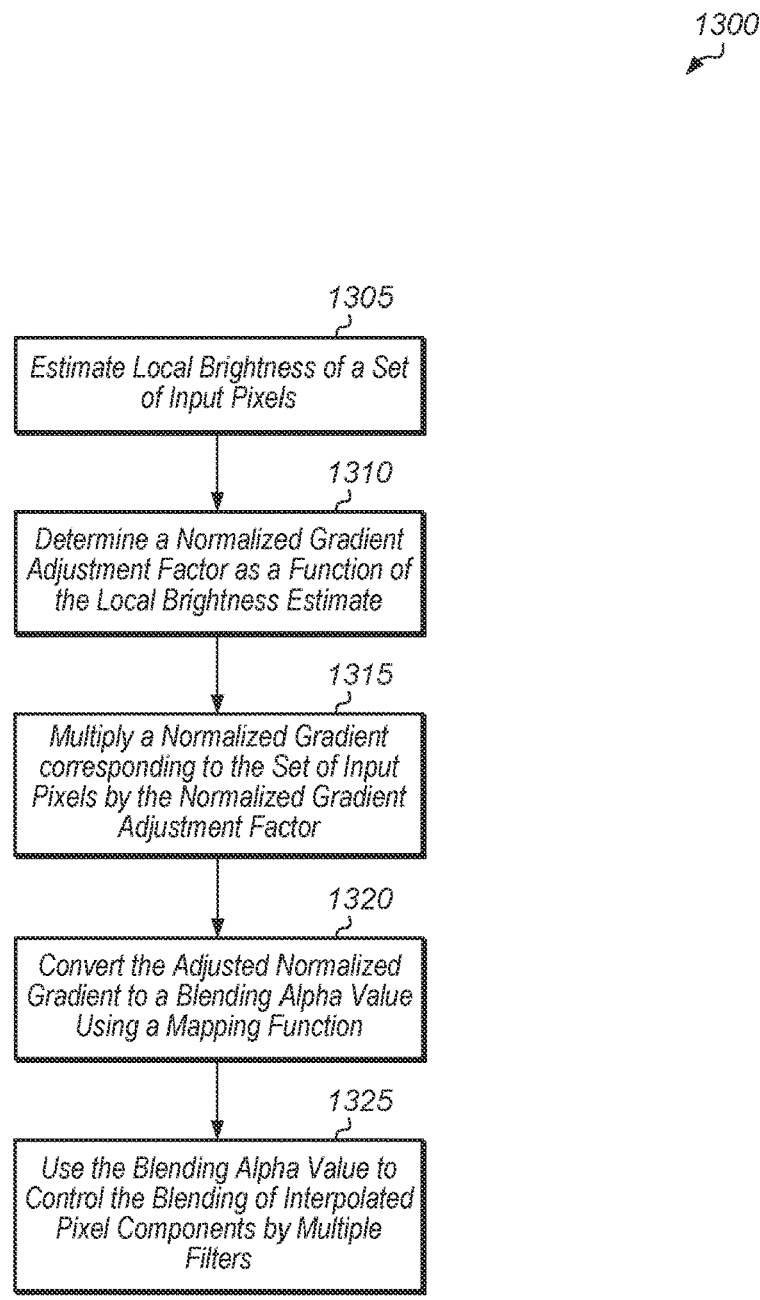
FIG. 13 is a generalized flow diagram illustrating one implementation of a method for adjusting a blending alpha value based on an estimate of local brightness.
Figure 14:
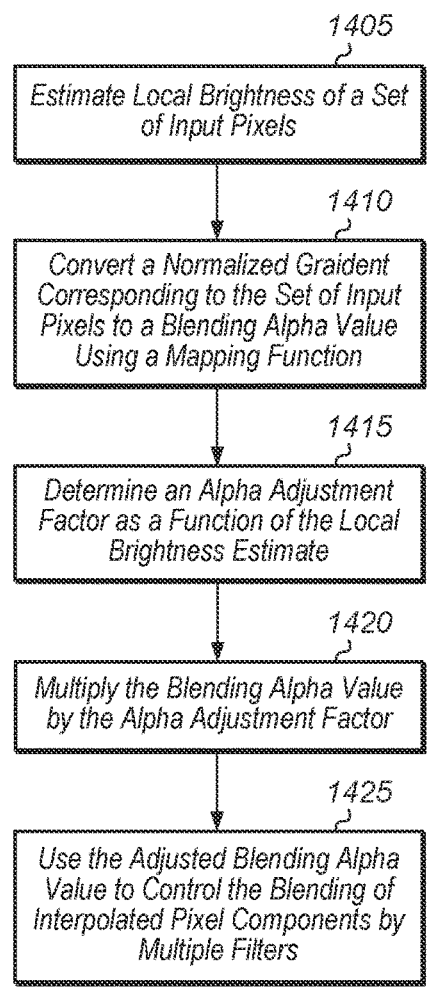
FIG. 14 is a generalized flow diagram illustrating another implementation of a method for adjusting a blending alpha value based on an estimate of local brightness.

Referring now to FIG. 11, one implementation of a method 1100 for employing gradient adaptive ringing control for image processing is shown. For purposes of discussion, the steps in this implementation and those of FIG. 12-14 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1100 (and methods 1200-1400).

An image processing circuit receives a set of pixels of an image or video frame (block 1105). The set of pixels can include any number of pixels in one dimension or two dimensions of the image/frame. The set of pixels can also be encoded in any of different types of formats (e.g., RGB, R'G'B, Y'C'bC'r). The image processing circuit can include any number of sub-circuits, such as a blending alpha calculation circuit and a blend circuit.

Next, the blending alpha calculation circuit calculates a plurality of gradients associated with one or more pixel components of the set of pixels (block 1110). In one implementation, the plurality of gradients that are calculated by the blending alpha calculation circuit include a low-pass filtered brightness component gradient over the set of pixels, a maximum brightness component gradient over the set of pixels, and a normalized brightness gradient as a ratio of the low-pass filtered brightness component gradient over the maximum brightness component gradient. The brightness component can be a luminance or luma component, depending on whether the pixels are encoded in linear or non-linear space, respectively. In other implementations, other gradients associated with one or more pixel components of the set of pixels can be calculated by the blending alpha calculation circuit in block 1110.

Then, the blending alpha calculation circuit generates a blending alpha value based on the plurality of gradients (block 1115). In one implementation, the blending alpha calculation circuit converts a normalized gradient into the blending alpha value using a mapping function. In one implementation, the mapping function is pre-tuned for the coefficients of the low-pass filter used to generate the low-pass brightness gradient for the set of pixels. In other implementations, the blending alpha calculation circuit uses any of various other suitable techniques for generating the blending alpha value based on the plurality of gradients.

Next, a blending circuit blends filtering of the set of pixels between a plurality of filters based on the blending alpha value (block 1120). In one implementation, the plurality of filters include a ringing-free filter and a ringing-prone filter. In other implementations, the plurality of filters include other numbers and/or types of filters. Then, subsequent to filtering, a filtered version of the set of pixels is driven to a display (block 1125). After block 1125, method 1100 ends. Alternatively, instead of being driven to a display, the filtered version of the set of pixels can be sent through additional processing stages and/or stored in a memory device. The filtered version of the set of pixels can also be referred to herein as one or more interpolated pixels.

Turning now to FIG. 12, one implementation of a method 1200 for generating a normalized brightness gradient for a set of input pixels is shown. A blending alpha calculation circuit calculates a plurality of gradients for brightness components of a set of input pixels (block 1205). In one implementation, each gradient of the plurality of gradients is calculated as the absolute value of the difference between brightness components of a corresponding pair of adjacent pixels. The brightness components can be luma or luminance components. Next, the blending alpha calculation circuit calculates a low-pass filtered brightness component gradient over the set of pixels (block 1210). In one implementation, the low-pass filtered brightness component gradient is calculated as the average of the gradients for the set of pixels. In another implementation, for a set of four pixels, the low-pass filtered brightness component gradient is calculated as the sum of 0.25 multiplied by the first gradient, 0.5 multiplied by the second gradient, and 0.25 multiplied by the third gradient. In other implementations, the low-pass filtered brightness component gradient is calculated using other suitable techniques.

Then, the blending alpha calculation circuit selects a maximum brightness component gradient from the plurality of gradients (block 1215). Next, the blending alpha calculation circuit calculates a normalized brightness gradient as a ratio of the low-pass filtered brightness component gradient over the maximum brightness component gradient (block 1220). After block 1220, method 1200 ends. The normalized brightness gradient calculated in block 1220 can be used to generate a blending alpha value. The blending alpha value can then be used for blending filtering of the set of input pixels between a plurality of filters.

Turning now to FIG. 13, one implementation of a method 1300 for adjusting a blending alpha value based on an estimate of local brightness is shown. A blending alpha calculation circuit estimates local brightness of a set of input pixels (block 1305). In one implementation, the blending alpha calculation circuit estimates local brightness using linear interpolation of luminance or luma between the closest neighboring pixels. For example, for a one-dimensional interpolator, the local brightness is estimated by two-tap interpolation as follows: $S=Y(1)+(Y(2)-Y(1))*P$, where $P=[0.0,1.0]$ is an interpolation phase. For a two-dimensional interpolator, in one implementation, the local brightness is estimated by 4×4 tap interpolation of a two-dimensional pixel grid (e.g., grid 410 of FIG. 4) as follows: $S=(1-P_x)*(1-P_y)*Y(1,1)+P_x*(1-P_y)*Y(1,2)+(1-P_x)*P_y*Y(2,1)+P_x*P_y*Y(2,2)$, where $P_x=[0.0,1.0]$ and $P_y=[0.0,1.0]$ are horizontal and vertical interpolation phases, respectively. In other implementation, the blending alpha calculation circuit uses other techniques for generating the estimate of local brightness. Next, the blending alpha calculation circuit determines a normalized gradient adjustment factor as a function of the local brightness estimate (block 1310). In one implementation, the function of normalized gradient adjustment factor calculation from the local brightness estimate is defined as $Fs(S)=(S)^{E^S}$, where $E^S$ is a tuning parameter. This function can be approximated using a downloadable table. In another implementation, the normalized gradient adjustment factor is set equal to the local brightness estimate. In other implementations, other functions are used to determine the normalized gradient adjustment factor from the local brightness estimate.

Then, the blending alpha calculation circuit multiplies a normalized gradient corresponding to the set of input pixels by the normalized gradient adjustment factor (block 1315). In one implementation, the normalized gradient is generated as described in method 1200 of FIG. 12. Next, the blending alpha calculation circuit converts the adjusted normalized gradient to a blending alpha value using a mapping function (block 1320). The mapping function can be pre-tuned for different sets of filter coefficients, different types of video content, different pixel formats, and so on. Then, based on the blending alpha value, a blend circuit controls the blending of interpolated pixel components by multiple filters (block 1325). After block 1325, method 1300 ends.

Turning now to FIG. 14, another implementation of a method 1400 for adjusting a blending alpha value based on an estimate of local brightness is shown. A blending alpha calculation circuit estimates local brightness of a set of input pixels (block 1405). In one implementation, the blending alpha calculation circuit estimates local brightness using linear interpolation of luminance or luma between the closest neighboring pixels. Next, the blending alpha calculation circuit converts a normalized gradient corresponding to the set of input pixels to a blending alpha value using a mapping function (block 1410). The mapping function can be pre-tuned for different sets of filter coefficients, different types of video content, different pixel formats, and so on. In one implementation, the normalized gradient is generated as described in method 1200 of FIG. 12.

Then, the blending alpha calculation circuit determines an alpha adjustment factor as a function of the local brightness estimate (block 1415). In one implementation, the function of alpha adjustment factor calculation from the local brightness estimate is defined as $Fs(S)=(S)^{E^S}$. In another implementation, the alpha adjustment factor is set equal to the local brightness estimate. In other implementations, other functions are used to determine the alpha adjustment factor from the local brightness estimate. Then, the blending alpha calculation circuit multiplies the blending alpha value by the alpha adjustment factor (block 1420). Next, a blend circuit uses the adjusted blending alpha value (generated by multiplying the blending alpha value by the alpha adjustment factor) to control the blending of interpolated pixel components by multiple filters (block 1425). After block 1425, method 1400 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. The implementations are applied for up-scaled, down-scaled, and non-scaled images. Numerous variations and modifications will become apparent to those skilled in the art once the above disclosure is fully appreciated. It is intended that the following claims be interpreted to embrace all such variations and modifications.

What is claimed is:

1. An apparatus comprising:
a blending alpha calculation circuit configured to generate a blending alpha value based on a normalized gradient corresponding to a plurality of gradients associated with one or more pixel components of a set of pixels of an image, wherein the normalized gradient is generated based on a low-pass filtered gradient of the one or more pixel components divided by a maximum gradient of the one or more pixel components; and
a blend circuit configured to blend filtering of the set of pixels between a plurality of filters based on the blending alpha value, wherein subsequent to filtering a filtered version of the set of pixels is driven to a display.

2. The apparatus as recited in claim 1, wherein calculating the plurality of gradients associated with one or more pixel components of the set of pixels of the image comprises:
calculating a low-pass filtered brightness component gradient over the set of pixels;
calculating a maximum brightness component gradient over the set of pixels; and
calculating a normalized brightness gradient as a ratio of the low-pass filtered brightness component gradient over the maximum brightness component gradient.

3. The apparatus as recited in claim 2, wherein the blending alpha calculation circuit is further configured to convert, with a mapping function, the normalized brightness gradient into the blending alpha value.

4. The apparatus as recited in claim 2, wherein the blend circuit is further configured to:
calculate an adjustment factor as a function of a local brightness estimate; and
multiply the normalized gradient by the adjustment factor before conversion to the alpha blending value.

5. The apparatus as recited in claim 2, wherein the blend circuit is further configured to:
calculate an adjustment factor as a function of a local brightness estimate;
map the normalized gradient to the alpha blending value; and
multiply the alpha blending value by the adjustment factor.

6. The apparatus as recited in claim 1, wherein the one or more pixel components are luma components of the set of pixels.

7. The apparatus as recited in claim 1, wherein the one or more pixel components are luminance components of the set of pixels.

8. A method comprising:
calculating, by a blending alpha calculation circuit, a plurality of gradients associated with one or more pixel components of a set of pixels of an image;
generating, by a blending alpha calculation circuit, a blending alpha value based on a normalized gradient corresponding to a plurality of gradients associated with one or more pixel components of a set of pixels of an image, wherein the normalized gradient is generated based on a low-pass filtered gradient of the one or more pixel components divided by a maximum gradient of the one or more pixel components; and
blending, with a blend circuit, filtering of the set of pixels between a plurality of filters based on the blending alpha value.

9. The method as recited in claim 8, wherein calculating the plurality of gradients associated with one or more pixel components of the set of pixels of the image comprises:
calculating a low-pass filtered brightness component gradient over the set of pixels;
calculating a maximum brightness component gradient over the set of pixels; and
calculating a normalized brightness gradient as a ratio of the low-pass filtered brightness component gradient over the maximum brightness component gradient.

10. The method as recited in claim 9, further comprising converting, with a mapping function, the normalized brightness gradient into the blending alpha value.

11. The method as recited in claim 9, further comprising:
calculating an adjustment factor as a function of a local brightness estimate; and
multiplying the normalized gradient by the adjustment factor before conversion to the blending alpha value.

12. The method as recited in claim 9, further comprising:
calculating an adjustment factor as a function of a local brightness estimate;
mapping the normalized gradient to the alpha blending value; and
multiplying the blending alpha value by the adjustment factor.

13. The method as recited in claim 8, wherein the one or more pixel components are luma components of the set of pixels.

14. The method as recited in claim 8, wherein the one or more pixel components are luminance components of the set of pixels.

15. A system comprising:
a memory storing a set of pixels of an image; and
circuitry configured to:
- calculate one or more gradients associated with one or more pixel components of a set of pixels of an image;
- generate a blending alpha value based on a normalized gradient corresponding to a plurality of gradients associated with one or more pixel components of a set of pixels of an image, wherein the normalized gradient is generated based on a low-pass filtered gradient of the one or more pixel components divided by a maximum gradient of the one or more pixel components; and
- blend filtering of the set of pixels between a plurality of filters based on the blending alpha value.

16. The system as recited in claim 15, wherein calculating the one or more gradients associated with one or more pixel components of the set of pixels of the image comprises:
- calculating a low-pass filtered brightness component gradient over the set of pixels;
- calculating a maximum brightness component gradient over the set of pixels; and
- calculating a normalized brightness gradient as a ratio of the low-pass filtered brightness component gradient over the maximum brightness component gradient.

17. The system as recited in claim 16, wherein the circuitry is further configured to convert, with a mapping function, the normalized brightness gradient into the blending alpha value.

18. The system as recited in claim 16, wherein the circuitry is further configured to:
- calculate an adjustment factor as a function of a local brightness estimate; and
- multiply the normalized gradient by the adjustment factor before conversion to the alpha blending value.

19. The system as recited in claim 16, wherein the circuitry is further configured to:
- calculate an adjustment factor as a function of a local brightness estimate;
- map the normalized gradient to the alpha blending value; and
- multiply the alpha blending value by the adjustment factor.

20. The system as recited in claim 15, wherein the one or more pixel components are luma components of the set of pixels.

* * * * *